United States Patent [19]

Burnett

[11] 4,455,548

[45] * Jun. 19, 1984

[54] CALL SYSTEM AND METHODS AND APPARATUS FOR OPERATING SAME

[76] Inventor: Dorothy K. Burnett, 87 Pine St., Belmont, Mass. 02178

[*] Notice: The portion of the term of this patent subsequent to Nov. 29, 2000 has been disclaimed.

[21] Appl. No.: 381,082

[22] Filed: May 24, 1982

Related U.S. Application Data

[63] Continuation-in-part of Ser. No. 228,270, Jan. 26, 1981.

[51] Int. Cl.[3] .......................... G08B 7/06; H04M 11/02

[52] U.S. Cl. .......................... 340/293; 340/331; 340/573; 340/815.02; 340/825.36

[58] Field of Search .............. 340/332, 573, 574, 331, 340/326, 293, 286 R, 825.49, 825.36, 815.21, 815.02

[56] References Cited

U.S. PATENT DOCUMENTS

| | | | |
|---|---|---|---|
| 1,367,583 | 2/1921 | Bobroff | 340/332 |
| 2,736,888 | 2/1956 | McLain | 340/825.49 |
| 2,896,021 | 7/1959 | Phillips | 179/1 |
| 2,910,680 | 10/1959 | McLain | 340/332 |
| 2,971,135 | 2/1961 | Ebert | 340/332 |
| 3,430,218 | 2/1969 | Healey | 340/533 |
| 3,430,224 | 2/1969 | Krantz | 340/825.36 |
| 3,651,512 | 3/1972 | Summers | 340/286 |
| 3,858,629 | 6/1974 | Baynard, Jr. | 340/332 |
| 3,911,425 | 10/1975 | Muncheryan | 340/523 |
| 4,347,501 | 8/1982 | Akerberg | 340/573 |

*Primary Examiner*—Glen R. Swann, III

*Attorney, Agent, or Firm*—Hamilton, Brook, Smith & Reynolds

[57] ABSTRACT

An improved call system has a signal sending apparatus, a message receiving station located at a distance from the sending apparatus, and signal generating means located at the receiving station. The signal sending apparatus includes a call box for selectively energizing the generating means and producing a set of coded signals, each of which, when in communication with the receiving station, calling for a response which is determined by the specific message characteristics of the communicating signal. The signals may be generated in the form of light, sound or both, controlled in duration and intensity, and communication may be through electrical conductors, by radio, by telephone and other means.

In one specific aspect the message receiving station may be a nurses call station in a hospital and the call box may be operated by a person in need of assistance in a hospital room or other area. The call box includes switch means for energizing the signal generating means and producing a set of coded signals which are prioritized in terms of urgency of need and the needee may select a specific signal calling for (A) a hospital aide, (B) a nurse, or (C) emergency treatment, thus substantially increasing efficiency of use of hospital personnel as well as enhancing patient's security.

10 Claims, 21 Drawing Figures

*Fig. 12*
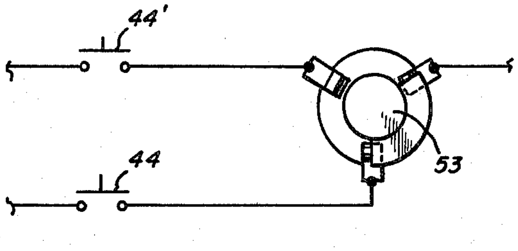
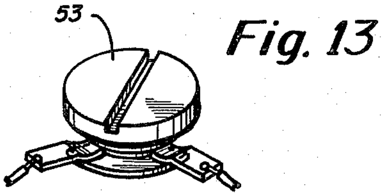
*Fig. 13*
*Fig. 14*
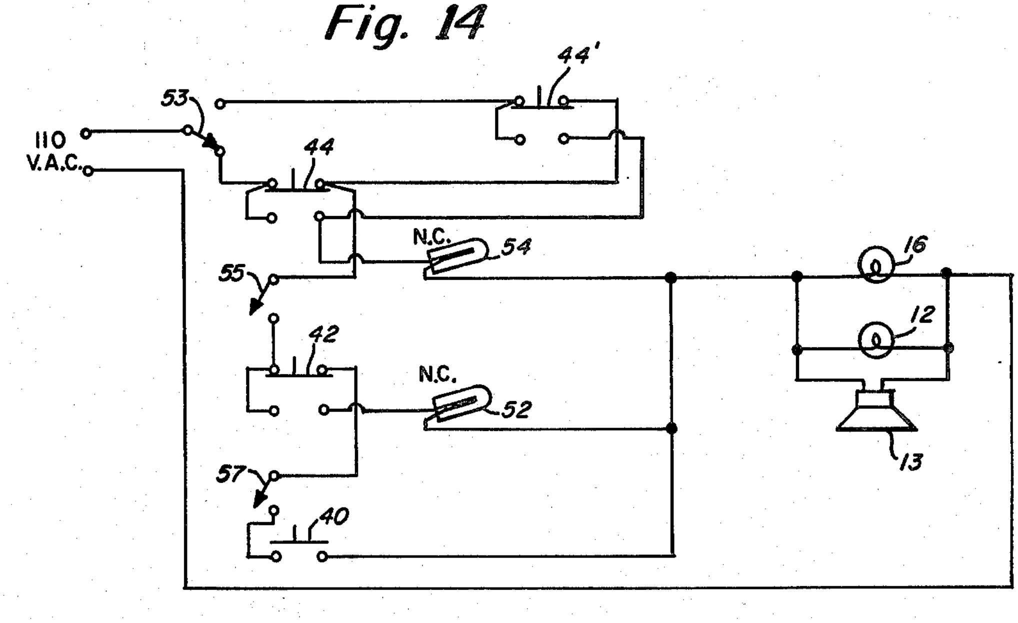

CALL SYSTEM AND METHODS AND APPARATUS FOR OPERATING SAME

CROSS-REFERENCE TO A RELATED APPLICATION

The present invention is a continuation in part of an earlier filed application entitled SIGNAL DISPLAY SYSTEM AND LUMINAIRE APPARATUS FOR OPERATING SAME, Ser. No. 228,270 filed Jan. 26, 1981 and further relates to an improved call system and methods and apparatus for operating same.

FIELD OF THE INVENTION

Call systems of many different types are well known in the art and deal with various situations. However, in the field of rendering assistance to persons in need of help, as may for example be carried out in hospitals, nursing homes and various other areas, the form of assistance, in a great many instances, falls into three general classes, each of which is determined by the urgency of need of the needee requiring assistance and the invention call system, although not limited thereto, is especially concerned with this classification of need.

Typical of this classification are the following:

A. Communication between a call station and the needee where the need is of a minor nature, as may be the case for example where a patient in a hospital may require only the services of a hospital aide, B. Communication between a call station and a needee where the need is of a more urgent nature, as may be the case where a patient in a hospital may require the services of a nurse or doctor, and C. Communication between a call station and a needee where a hospital patient's need is highly urgent requiring emergency treatment, as in prompt treatment for suffocation, hemorrhage shock, cardiac arrest and the like.

Of great significance is the fact that in most modern hospitals a call for emergency treatment must be made by a nurse by actuating an electrical switch and the patient has no adequate recourse. Where the patient does have available a signal light, bell or buzzer, assistance by such means may be unsatisfactory as urgency of the calls is non-distinguishable and it is commonly recognized that an inordinate amount of time may be required for a patient's call to be answered.

Patents disclosing more extensive arrangements include U.S. Pat. No. 1,367,583, which discloses a system wherein signals are displayed outside a patient's room in response to operation by the patient of a motor driven enunciator drum which selects the services required by the patient, all of which are to be provided to a patient in his room and only a nurse's call is achieved by this patient.

U.S. Pat. No. 2,736,888 discloses an enunciator system by means of which a patient may indicate specific services utilizing a transformer and relay box which is required to be supported on a stand or table beside a patient's bed in a position which is inaccessible to a very sick patient and a hindrance to the normal servicing attention given by a nurse to a patient. The number of patient requests which can be made is limited.

U.S. Pat. No. 2,910,680 discloses another form of enunciator means by which a patient may indicate services required through a bank of switch buttons which are required to be supported beside a patient's bed in a way that is inaccessible to a very sick patient and a hindrance to normal nursing services. The number of patient requirements which can be made is limited.

U.S. Pat. No. 2,896,021 discloses an intercommunication system by which a patient may converse with hospital personnel and specify needed services. The equipment limits information to conversation between patient and nurses station, delays arrival of urgent calls when multiple calls are being made, is cumbersome for aides and nurses already on the floor.

At the present time, therefore, there continues to exist a need for a proper emergency call being made by a patient from a hospital room which can be recognized as such, as well as for more effective means of triaging or prioritizing the urgency of multiple patient calls arriving at a nurses call station.

SUMMARY OF THE INVENTION

The invention is especially concerned with a call system which includes a call box operable to produce signals coded with respect to classified needs of assistance by a person requiring help.

It is a chief object of the invention to provide improved methods and apparatus by which a person in need of help may communicate with a nurses receiving station located at a distance from the needee.

Another object of the invention is to provide for calling for a form of help which is specified at a receiving station by the message characteristics of a signal selected from a coded set of signals.

Another object of the invention is to devise a call system which includes a set of coded signals prioritized in terms of urgency of need and selectively operable by a person in need of help.

A further object of the invention is to devise apparatus which includes a special call box component capable of producing coded signals which indicate low, medium or high levels of urgency and being manually operable by a person in need of assistance.

Still another object is to devise a call box construction which may be located at the bedside of a hospital patient or which may be worn by an ambulatory patient or by other parties.

Another object is to construct a portable, hand-held call box which may be conveniently attached to a patient's bedside or person and which contains a plurality of switches arranged in such relationship to one another that the patient may differentiate each of the switches by a sense of touch or other means.

Another object is to devise a call box structure having a plurality of switches, one of which is conveniently operable by a person who is in need of emergency treatment and partially incapacitated may simply grab the switch using one hand or the other as may be available.

Another object is to recess and indent the emergency grab so that although it is readily available when needed, it is not subject to accidental activation.

Another object is to provide a call box structure in which a plurality of switches occur in a predetermined order of importance and any one or all of the switches may be rendered inoperative by hospital personnel.

Another object is to provide call box means having signals which occur in an ascending order of importance and arranged such that each more urgent signal automatically overrides a less urgent signal.

The foregoing objectives may be realized, it has been found, by a call system having a message receiving station, a signal sending apparatus, signal generating means provided at the message receiving station and special call box means characterized in that the call box is constructed to readily fit the hand of a patient who may be an invalid and is operable to selectively energize the signal generating means and produce a set of coded signals each of which when in communication with the receiving station calls for a response which is determined by the specific message characteristics of the communicating signal. The coded signals, in one desirable form, may be established with relation to most common classes of need in a hospital, i.e. need for a hospital aide; need for a nurse; need for emergency treatment, and the signals may be prioritized in terms of the urgency of need. As one example of producing signals with specific message characteristics there may be employed one signal which is of a sustained or continually maintained nature by sound or light at a nurses call station to call for a hospital aide. A second signal may be a slowly repeated or intermittant energization of sound or light means at the nurses call station to call for a nurse's assistance. A third signal may consist of a rapidly repeated sound or light signal which calls for emergency treatment. Various other means may be employed in signalling as by using sound and light and varying the intensity of one or all of these agencies or by the use of bells, buzzers, flashing lights, or the like.

BRIEF DESCRIPTION OF THE DRAWINGS

FIG. 12 is a detail view of an alternate form of switch means for use with the call box disclosed above in general.

FIG. 13 is a detail view of another alternative form of switch means.

FIG. 14 is a diagrammatic view illustrating still another modification of switch and circuitry for the call box arrangement illustrated in FIG. 7.

DETAILED DESCRIPTION OF THE INVENTION

The principle parts of the call system of the invention comprises a signal sending apparatus, a message receiving station, and signal generating means provided at the message receiving station. The call system is further characterized in that the signal sending apparatus includes a specially devised call box which is operable to selectively engage the signal generating means and produce a coded set of signals, each of which may call for a response of a predetermined nature from the message receiving station.

The call system of this invention has originated from a recognition of the fact that in many situations, responses at a message receiving station may fall into a limited number of commonly recognized classes and the call box of the invention, is based on the concept of coding signals to evoke responses which are representative of each of the limited number of classes, and which may occur in a prioritized order of importance.

For example, in a hospital a call by a patient to a nurses receiving station may be responded to by (A) a hospital aide, (B) a nurse or doctor, or (C) by a hospital provision for dealing with an emergency such as a cardiac arrest team, use of oxygen, tourniquet and the like. Various other situations occur of a somewhat similar nature where a person needs help and requires responses of a limited number of classes.

In one specific aspect the call system of the invention is specifically concerned with application in hospital wherein signals coded in terms of specifying the three classes of hospital personnel above-noted may be employed.

Figure 1:
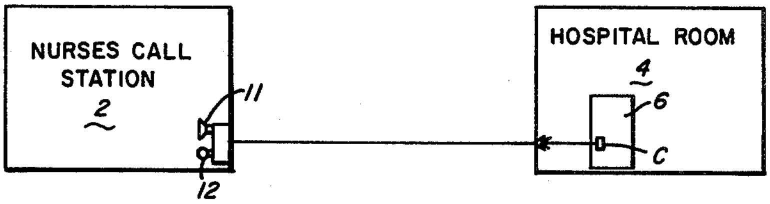
FIG. 1 is a diagrammatic view illustrating the call system of the invention with the message receiving station of the call system located in a hospital call station and a call box component located in a hospital room at a patient's bedside.
Figures 5, 6:
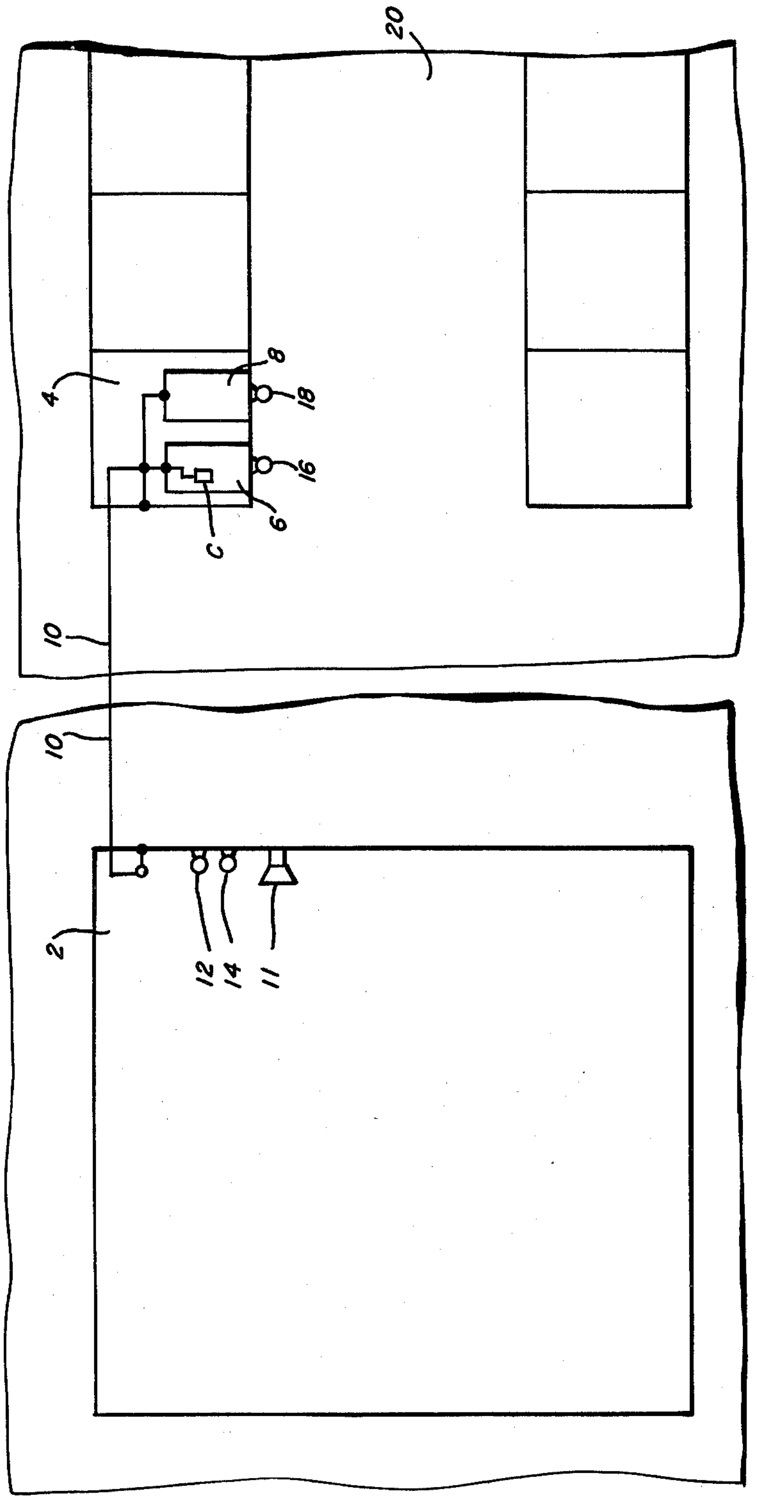
FIGS. 5 and 6 are diagrammatic views similar to FIG. 1, but showing further details of the receiving station and the patient's room with signal lights outside the door of the patient's room.

Attention is directed to FIGS. 1, 5 and 6 which illustrate diagrammatically by block diagram a message receiving station comprising a nurses call station in a hospital and denoted by numeral 2. Located at the call station are signal generating units which may, for example, consist of a bell, buzzer, or other sound means denoted by numeral 11 and a light source such as a lamp 12. Arranged to operate the signal generating means in a selective manner is a signal sending apparatus located at a distance from the call station 2 and connected to the signal generating means, for example by electrical conductor means.

Numeral 4 indicates a patient's room in which is located signal sending apparatus including a call box, generally denoted by arrow C, and numeral 10 denotes the electrical conductor means for connecting the call box C to the signal generating means through a set of switches.

As shown in FIG. 1, a patient's bed is indicated at 6 and in FIG. 6 a second patient's bed 8 is shown. This is a typical arrangement in a hospital room. It may also be desired to provide for light sources or lamps as 16 and 18 which are located ourside of the patient's room 4 in a position to be observed by hospital personnel passing along a corridor 20 and the two lamps are commonly operated by the patients as required. However, in the invention call system the lamps 16 and 18 may be operated in conjunction with energization of buzzer 11 and the energization may produce coded signals.

Figure 7:
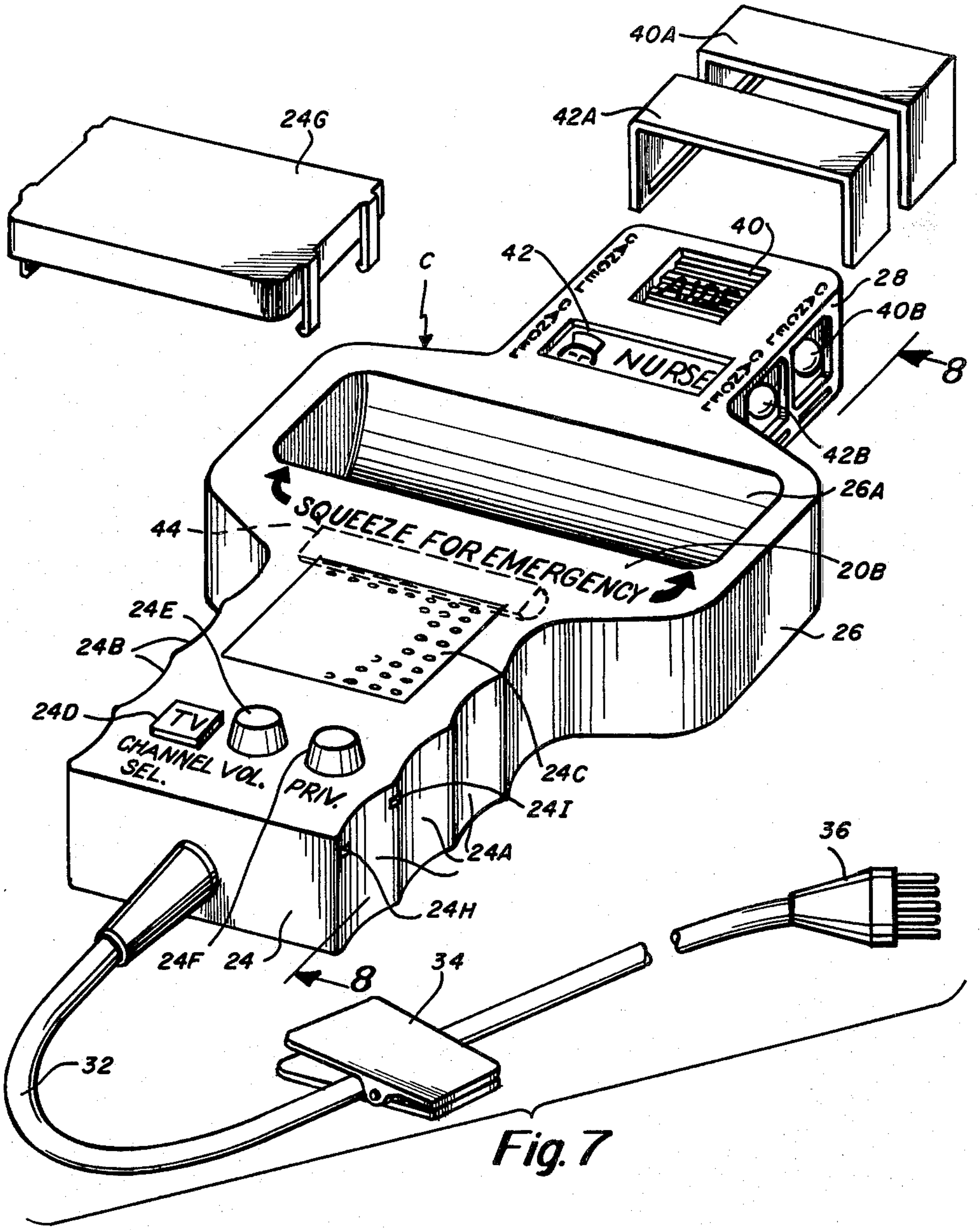
FIG. 7 is a perspective view illustrating the call box component of the call system in more detail.

In one preferred form the call box C will be made of plastic, metal or other material and formed by molding, machining and the like. As shown in FIGS. 7–10, inclusive, this preferred form of call box will be constructed as an elongated, relatively flat hollow enclosure body. The enclosure body is shaped with a relatively wide intermediate portion 26, as shown in FIG. 7, together with relatively narrow rear and front portions 24 and 28, respectively.

At their under sides portions 24, 26 and 28 have a common flat surface 30 which may be provided with a non-skid backing of rubber or the like for enabling the call box to resist sliding movement when placed on a bed or other surface. Connected through the rear portion 24 is an electrical cable 32 of coaxial type to which is attached a clip 34 which may be used to secure the call box C to a bed cover. At its other end the clip 32 is provided with a plug 36 for engagement in a wall receptacle.

Mounted at the upper side of the call box C are spaced apart switches including a switch 40 mounted on the front portion 28, a second switch 42 also mounted on the front portion 28 and a third switch 44 mounted on the intermediate portion 26.

An important feature of the invention resides in the construction of the call box C of a size and shape which can be readily encompassed by the hand of a patient with the fingers extended and wherein the switches may be readily differentiated one from the other by a patient through a sense of touch or other means and wherein the call box C is further provided with a switch housing arrangement for emergency use by a patient who may be partly incapacitated and only able to carry out a limited squeezing or gripping movement by curling the fingers inwardly. This emergency switch is recessed and turned inwardly so as to be readily accessible in emergency but not subject to accidental activation.

The arrangement of switches 40, 42 and 44 may be in an ascending order of importance such that as any one of the switches is closed a coded signal is transmitted to the nurses station by energizing the signal generating means 11 and 12 either separately or in conjunction with one another to produce signal characteristics which denote the order of magnitude of the urgency required in obtaining a signal response.

Considering in more detail switches 40, 42 and 44 the switch 40 may be a hospital aide switch and may produce a sustained energization of 11 or 12, or both. This switch is located in a forwardly arranged position such that it may be readily engaged by a patient and the exterior surface of the switch is of a roughened texture or other configuration readily distinguished by the sense of touch of a patient. This switch is lowest in order of importance of the three switches noted. It will be understood that electrical conductor means are located in the hollow enclosure body of the call box which are arranged to connect the switch to the signal generating means 11 and 12 and FIG. 11 is a wiring diagram illustrating one desirable arrangement of wiring for all of switches 40, 42 and 44.

Switch 42 may be a nurses call switch and is located rearwardly of, and quite close to, switch 40 as viewed in FIG. 7 and is characterized in this example by a relatively smooth surface, as distinguished from the rough textured surface of switch 40. Therefore, in this example, the smooth surface is also readily selected by finger touch of a patient when the surfaces of a nurse are required.

Figure 11:
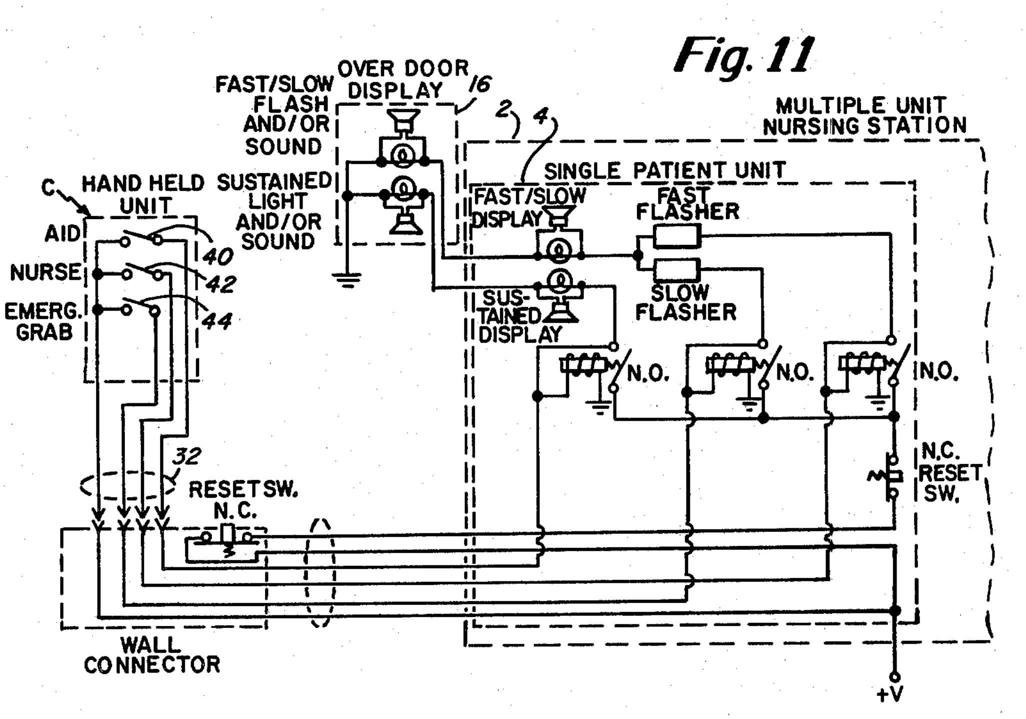
FIG. 11 is a schematic view illustrating diagrammatically one form of call signal system of the invention, including electrical circuit means and switches.

This switch 42 is of higher importance than switch 40 and as shown in FIG. 11, is electrically connected to provide for disabling switch 40 when operated. The electrical circuitry of FIG. 11 includes relay controls which provide for the switch 42 producing a slowly repeated coded signal. It is pointed out that the nurses call switch 42 provides a patient with a wide range of services which are normally provided by nurses and which are quite distinct from services carried out by a nurses aide.

Switch 44 is a third switch in a hierarchy of increasingly urgent responses called for and preferably comprises means for calling for emergency treatment. When this switch is closed it operates through the electrical circuit of FIG. 11 by the use of relay means as shown to provide for energization of 11 or 12, or both at a rate significantly faster than the rate of energization of signals when switch 42 is operating.

Figure 8:
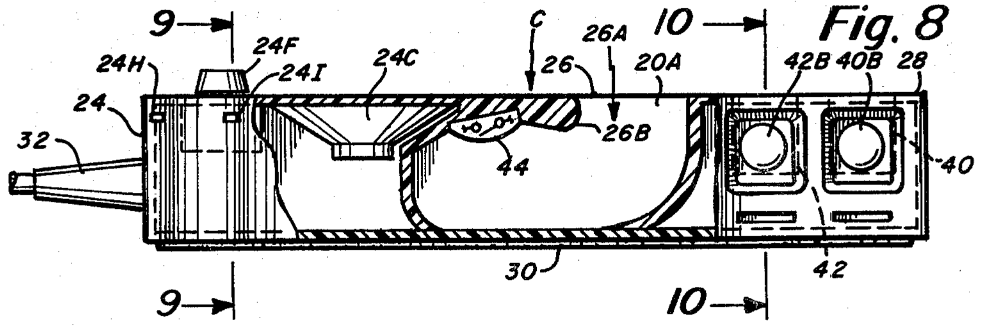
FIG. 8 is a cross-section taken on the line 8—8 of FIG. 7.
Figure 9:
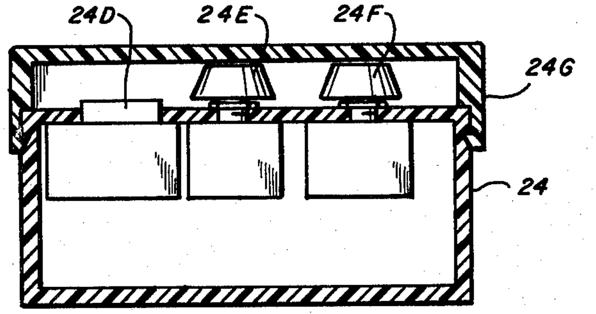
FIG. 9 is a cross-section taken on the line 9—9 of FIG. 8.
Figure 10:
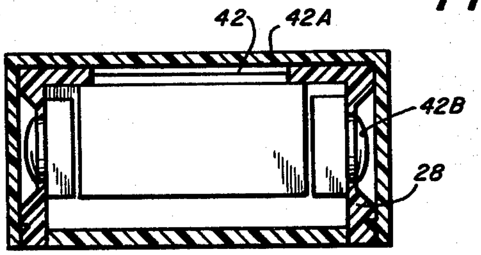
FIG. 10 is a cross-section taken on the line 10—10 of FIG. 8.

Attention is directed to FIG. 7 in which switch 44 is shown protectively contained in a manner such that it can be reached and operated by a simple hand grabbing movement and FIG. 8 illustrates a space 26A through which the fingers of a patient may be received and allowed to be curled into contact with the switch 44. The intermediate portion 26 of the call box C is chosen with reference to the size of an average patient's hand and the space or hand slot 26A is, at one side thereof, defined by a gripping edge 26B which is recessed at an under side thereof to protectively receive the switch 44 which may occur as a switch bar. It is pointed out that with this protectively housed arrangement accidental closing of switch 44 is prevented in most situations.

Closing switch 44 as described operates not only to energize the generating means 11 or 12, or both, but also disables switches 40 and 42, as has been illustrated diagrammatically in FIG. 11, and the switch is so arranged that it may take precedence when either switch 40 or 42 is closed. Thus it will be apparent that an emergency call, heretofore limited to a bathroom location in a hospital, may be transmitted by a patient from his bedside and thus control of a highly important nature is achieved.

It is again pointed out that portion 24 of the call box C is formed of a size suitable for gripping by the fingers of a patient's hand when the unit is to be picked up and moved about, and at opposite sides of the portion 24 there are provided finger slots as 24A and 24B to facilitate gripping.

It will be observed therefore that a unique arrangement of parts is suited to the needs of a bed patient and is realized by the provision of a hand grip portion closely adjacent to the emergency switch 44. By means of this arrangement of parts the patient may guide his hand forwardly from the part 24 across the hand slot 26A and make finger contact with either switch 40 or 42 and this may be readily done without the hospital room being illuminated and by the use of touch alone. It will also be seen that the switch 44 is readily operable by patients with minimal physical functioning, i.e. use of one hand only, partial paralysis, inability to speak, see or hear, or immobilized in a prone position.

There may also be provided in the rear portion 24 of call box C outlets of a conventional nature such as a combination microphone and speaker unit 24C, a television channel selector 24D, a volume control 24E and a privacy control 24F.

In the use of the call box C as above described, there may arise instances where nursing personnel may prefer to have a patient use a single switch such as the emergency switch 44 without becoming confused because of a three switch arrangement or for other reasons. With this in mind there has been further provided cover clips for covering over the nurses aide switch 40 and the nurses call switch 42, as well as the devices provided in the rear portion 24 of the call box C.

As shown in FIG. 7, a cover clip 40A of U-shaped configuration may be provided to overlie aide switch 40 so that it cannot be operated. The switch 40 may also have a disconnect button 40B and the U-shaped clip shields button 40B as well as switch 40.

Similarly, a cover clip 42A may be provided to overlie switch 42 so that it cannot be operated and one side of clip 42A is arranged to shield disconnect button 42B.

A third clip 24G may be detachably engaged with projections as 24H and 24I on rear portion 24 of call box C to eliminate use of the television channel selector, volume control and privacy control.

It may also be desired to utilize other means for rendering any one or all of the switches 40, 42 and 44 inoperative. For example, it may be desired to locate in the bottom side 30 of the call box 3 switch means for rendering inoperative all of the switches 40, 42 and 44. It may also be desired to provide "fall on" switch means which might be used by one who has no other recourse.

FIG. 12 is a bottom plan view of a dual switch arrangement by means of which the switch 44 may be selectively operated as shown in FIG. 8, or alternatively, a switch 44' may be selectively operated by means of a control switch 53. This arrangement provides for enabling one switch while disabling the other. It is intended that switch 44' may be located at some convenient point, as for example along the upper side of the call box.

In FIG. 12 the control switch 53 is in a position to enable switch 44 and disable switch 44'.

In FIG. 13 the dual arrangement is shown as viewed from an upper side thereof and encludes a slotted upper side in which a key or coin may be inserted to rotate the switch into a position in which switch 44' is enabled and switch 44 is disabled.

In FIG. 14 control switch 53 is shown in combination with enabling switches 55 and 57. Enabling switch 57 enables or disables switch 40, leaving only the nurse's call switch 42 and the emergency switches 44 or 44' operable.

Enabling switch 55 enables or disables switch 42 which utilizes bimetallic means 52 to control slow periodic operation of the signal generating means. Switch 55, if disabled, will also disable switch 40.

Enabling switch 53 enables one or the other of switches 44 or 44' and utilizes bimetallic member 54 to carry out fast periodic operation of the signal generating means and when positioned so as to enable switch 44', switch 53 disables switches 55 and 57.

Figure 2:
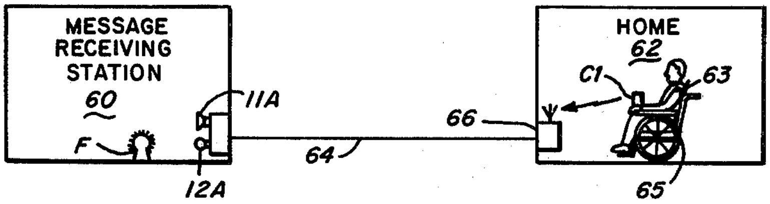
FIG. 2 is another diagrammatic view illustrating the call system with the message receiving station at a call answering station which may be in a hospital or elsewhere and with the call box component held by a person located in a nursing home, a dwelling house, or the like and in telephone communication with the receiving station.

As earlier disclosed, the invention call system may be employed to call for other classes of assistance and FIG. 2 is intended to illustrate diagrammatically a situation in which an elderly, ill or otherwise incapacitated person, living along in a dwelling place, needs help of several different forms, any one of which may be obtained through a message receiving station in communication with the needle by a telephone line over which coded signals may be selectively chosen by the needee through a call box C1.

As an example of one class of assistance, the needee may only desire a call via telephone as he wants to report something and is unable to dial the telephone. In this classification of need there may be employed a sustained signal of sound or light which may be generated at a message receiving station such as a nurses call station or at a 24-hour telephone answering service, and the sustained signal may be a modified telephone ring or buzz which is readily distinguishable from the normal telephone ring, or a sustained glow, or both.

In a second class of assistance the needee may want someone to go to the house or dwelling place where he is located, for example a neighbor, friend or member of the family and a similar limitation or inability to dial a telephone is experienced. In this case, the needee may send a coded signal similar in sound or light, or both, for the first noted class indicated by the signal is controlled through a call box C1 to produce a slowly repeated sound or light energization.

In a third class of assistance, the needee may require emergency assistance by a doctor, ambulance or police, and by means of the call box C1 the needee may produce coded signals at the receiving station which are characterized by very rapid generation of sound or light of the type described for the first two classes noted above.

It may also be desired to provide at the station 60 a code index card file having a card containing information with respect to the name, address and telephone number of the needee and such a file is denoted by reference character F in FIG. 2.

As indicated in FIG. 2, the numeral 60 denotes a message receiving station and numeral 62 denotes an area such as a room in a dwelling place in which is located a person 63 who is in need of help and who is elderly, ill or confined to a wheel chair 65, or otherwise incapacitated. It will be understood that the area is located at considerable distance from the telephone answering area 60 and, as is indicated diagrammatically, the station 60 is in communication with the area 62 by means of a telephone line 64 which is connected to a radio signalled automatic dialer 66 located in the dwelling place referred to above. Coded signals selected by the needee from a call box C1 are transmitted through the telephone line 64 to energize signal generating means at 11A and 12A for producing signals of sound or light at the receiving station whose characteristics may, for example, be specifically controlled in the manner disclosed above.

Figure 3:
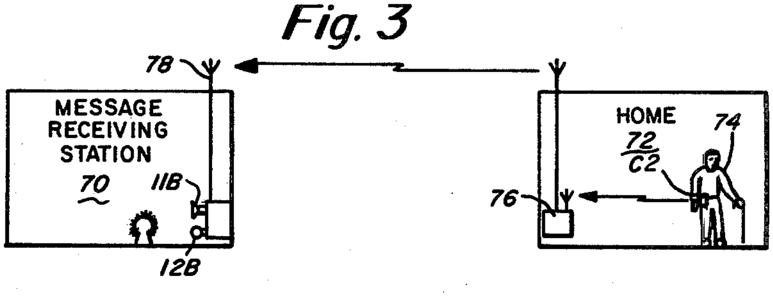
FIG. 3 is another diagrammatic view illustrating the call station at a receiving station and the call box carried by a handicapped person and in communication with the receiving station by radio.

FIG. 3 illustrates diagrammatically another situation where three general classes of assistance similar to those dealt with by the apparatus of FIG. 2 are required but communication by telephone line is not available and radio communication is employed utilizing transceiver means 76 is preferably mounted in a call box C2 carried by a person needing assistance. The needee may be handicapped and may be located either in a dwelling area or outside the dwelling area, as for example in a yard, patio, or the like.

Figure 15:
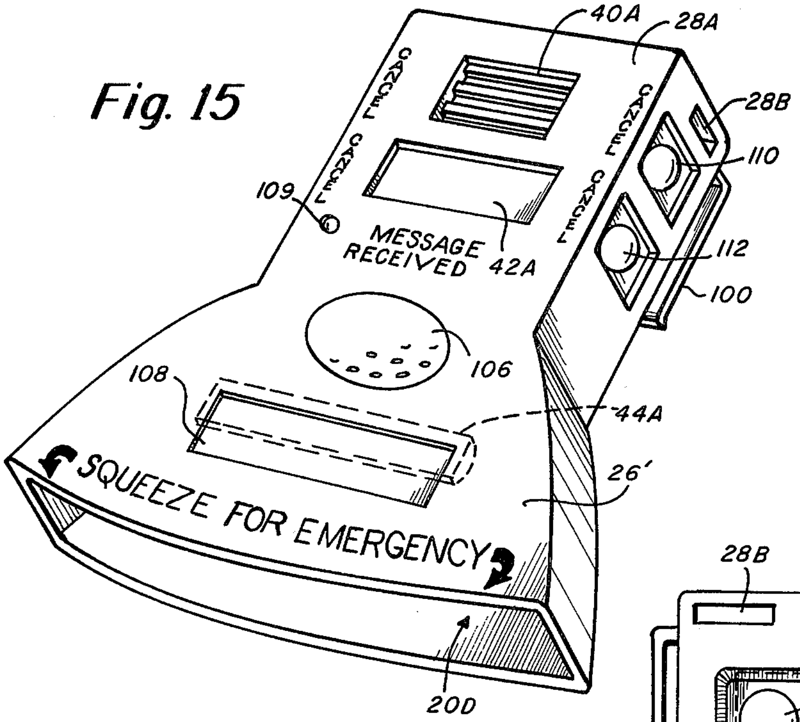
FIG. 15 is a perspective view illustrating a modified form of call box of the invention to be worn on the body for a wheelchair or ambulatory patient.
Figure 16:
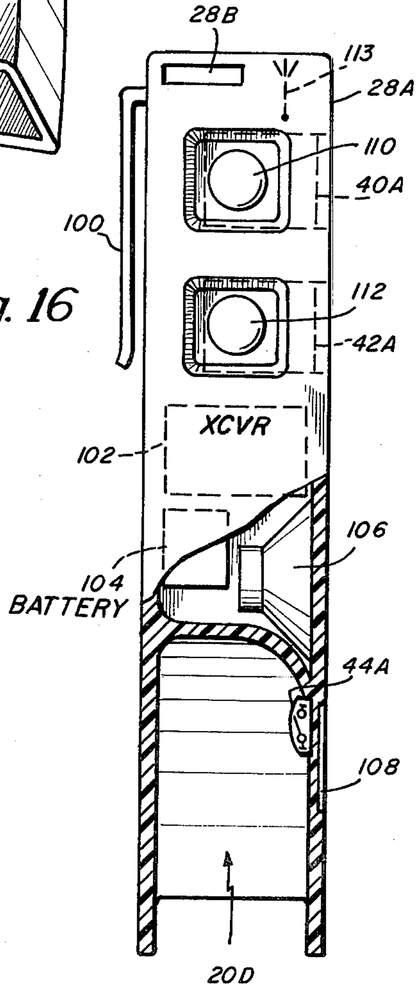
FIG. 16 is a side elevational view partly in cross-section of the call box structure of FIG. 15.

Numeral 70 denotes a receiving station which, as before, may be a nurses call station in a hospital or a 24-hour telephone answering service, and which is provided with sound and light means 11B and 12B, respectively. Numeral 72 refers to an area which may be in a dwelling place or may be outside of a dwelling place. Numeral 74 indicates a handicapped person in need of assistance who may have secured to his person by belt or other means a call box C2 which is of a modified construction, as illustrated in FIGS. 15 and 16.

As shown in these Figures, the call box C2 is constructed with a hollow enclosure portion 28A at the end of which is a slot 28B for receiving a belt therethrough. Mounted at the upper side of portion 28A are switches 40A and 42A. Extending outwardly from the portion 28A is an enlarged portion 26' which is open at one end to provide a grab slot 20D in which is protectively contained a switch bar 44A.

Located internally of the call box C2 is a radio transceiver unit 102 and a battery 104, together with a two-way speaker or buzzer 106. A label recess 108 provides a space for indicating the nature of discomfort or pain incurred by a patient. A feature of the call box C2 is a curved shape provided for the grab slot 20D which is designed to provide for the needee grabbing the switch bar 44A with either hand when the call box is suspended from a belt member.

Figure 4:
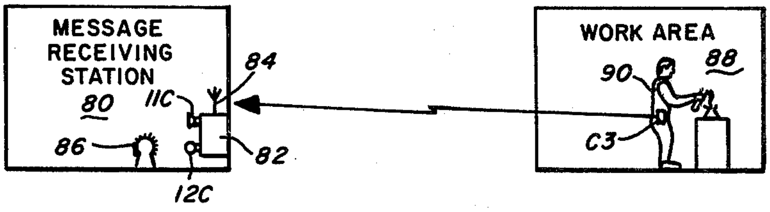
FIG. 4 is a diagrammatic view illustrating the call system at a receiving station in a plant or laboratory and with the call box near or carried by a person in a separate work area of the plant or laboratory.

FIG. 4 illustrates diagrammatically still another situation where three classes of assistance may be required by a person in need of assistance. In this case a person is located in a work area such as a plant, laboratory, or the like and is engaged in an activity wherein he may require (1) supplies to be brought, (2) assistance from a fellow worker, or (3) emergency assistance.

Figure 21:
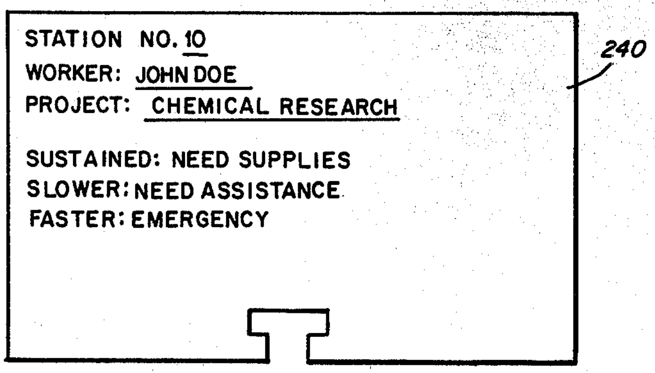
FIG. 21 is an elevational of another form of information card employed in the invention.

Numeral 80 denotes a message receiving station of the general form earlier disclosed having signal generating means 82 provided with an antenna 84 and a coded index card file 86. Numeral 88 refers to a work area in a plant, laboratory, or the like in which a worker 90 is engaged in an industrial task and wears a call box C3 similar in construction to the call box C2. An index card file 86, in one typical form, is further illustrated in FIG. 21.

It is pointed out that the three classes of assistance available through the apparatus of FIG. 4 is particularly suited to use in hazardous activities such as work with dangerous materials or work in a dangerous environment such as in a mine.

Figure 17:
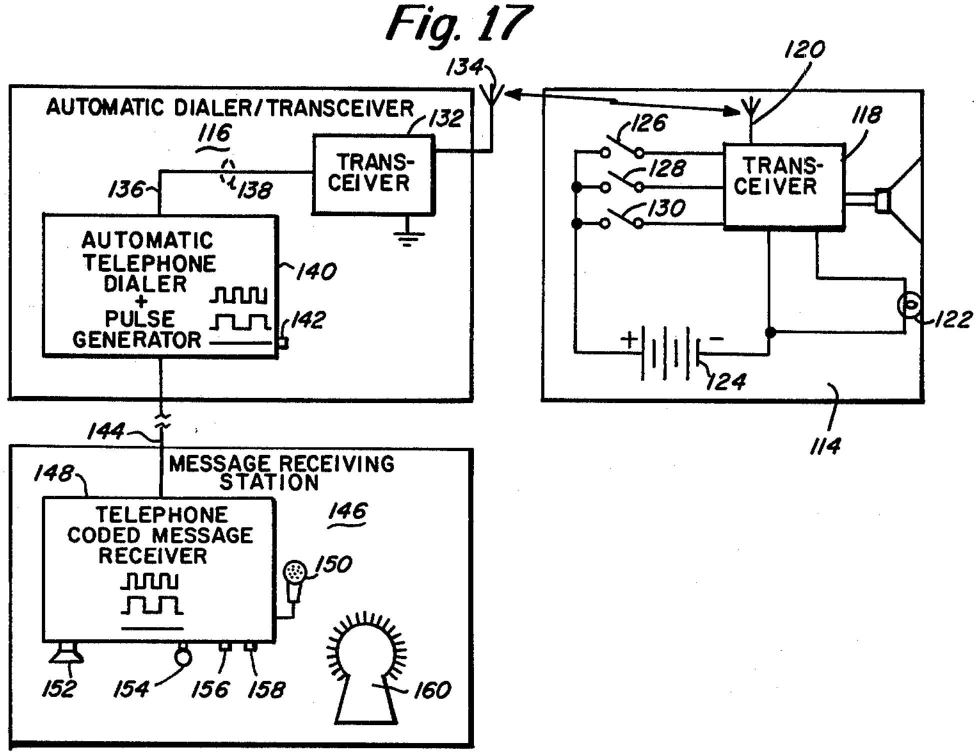
FIGS. 17 and 18 are diagrammatic views of modifications of the invention.

In FIG. 17 a call system of the invention utilizing a telephone line is illustrated diagrammatically in somewhat more detail. As shown therein, numeral 114 denotes a call box in which is located a battery 124, a transceiver 118 having a two-way speaker or beeper and connected to switches 126, 128 and 130 for use in the manner earlier disclosed. Numeral 122 denotes an acknowledgement light which may be used to advise the needee that his call has been received. Numeral 120 denotes an antenna member for the transceiver 118.

Numeral 116 denotes a separate area in the dwelling place where the needee may be with the transceiver 132 having an antenna 134 which operates an automatic dialing transceiver 140 through a line 136. Numeral 142 is a reset to re-establish the system. Numeral 144 denotes a telephone line which is connected to a message receiving station 146. A message receiver 148 is provided with a two-way communication element 150 and further includes a buzzer 152, a light source 154, a reset button 156 and an acknowledge button 158. Numeral 160 refers to an index card file.

It will be understood that the apparatus of FIG. 17 may, as before, be used to provide coded signals sent by a needee to obtain a response which is determined by the characteristic of the signal sent.

Figure 18:
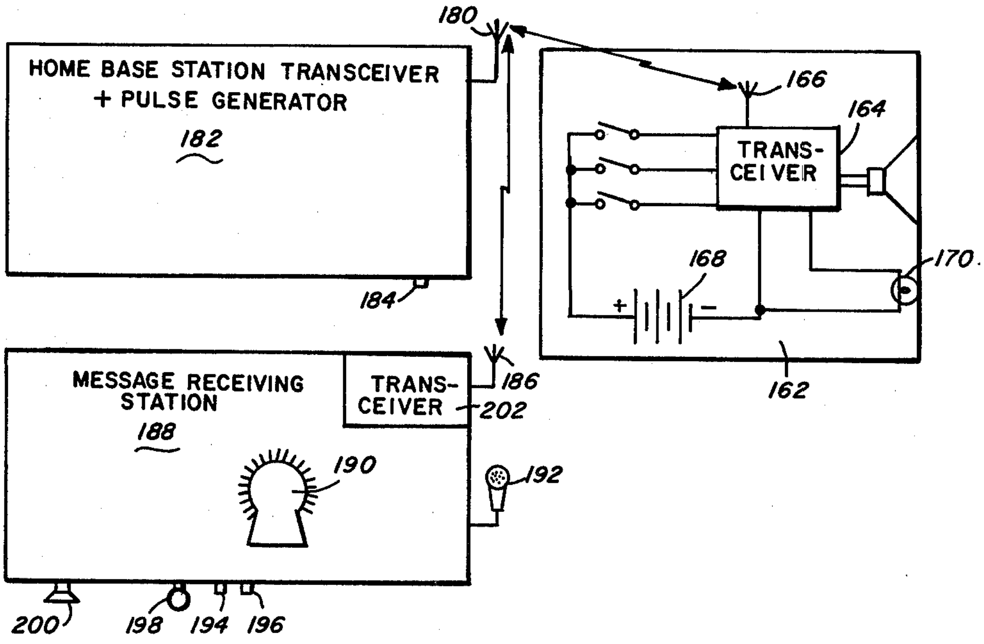

In FIG. 18 another desirable arrangement is illustrated wherein numeral 162 denotes a call box having a battery 168, an acknowledge light 170, a transceiver 164 and an antenna 166 which operates through switches similar to those shown in FIG. 17. Numeral 182 denotes an area in the dwelling place of the needee in which is installed a transceiver and pulse generator member having a reset button 184. This transceiver and pulse generator is in communication through an antenna 186 and a transceiver 202 in a message receiving station and a two-way communication element 192 is provided at the station and also included is a buzzer 200, a light 198, a reset button 194 and an acknowledge button 196.

Figure 19:
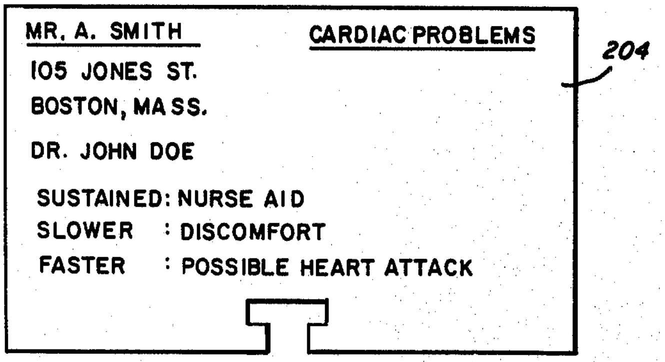
FIG. 19 is an elevational view of an information card employed in the invention.

In this message receiving station of FIG. 18 there is provided an index card file 190 and in FIG. 19 an index card file is shown in more detail indicating the nature of information which may be at hand at the receiving station and which provides for suitable remedies.

Figure 20:
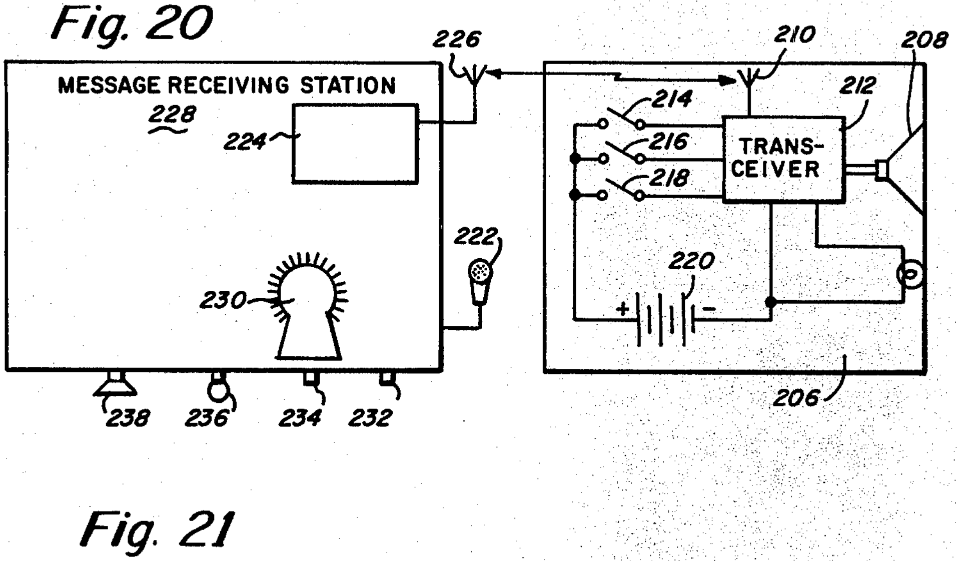
FIG. 20 is a diagrammatic view of another modification of the invention.

In FIG. 20 still another form of call apparatus of the invention is shown including a call box 206 having a battery 220, switches 214, 216 and 218, and a speaker 208, together with a transceiver 212 having an antenna 210. Numeral 228 denotes a message receiving station at which is a transceiver 224 having an antenna 226 through which the signals from the call box may be received and this message receiving station may include a buzzer 238, a light 236, a reset button 234, an acknowledge button 232 and there may be also provided means for two-way communication denoted by the numeral 222. Numeral 230 denotes an index card file similar to those earlier described.

It will be understood that the signalling means may vary as for example by one, two and three dots, red, yellow and blue coloring and other arrangements. It will also be understood that the information set forth in FIG. 19 may be modified as follows:

| | | |
|---|---|---|
| Smith, Arthur Age 76 CARDIAC PROBLEMS | | |
| 105 Jones St. | | |
| Boston, MA 02155 - 492-7733 | | |
| Dr. John Doe - -92-5200 | | |
| Sustained: | Need Neighbor - (Joe Davie) | 495-7634 |
| Slower: | Need Homecare Aide | 495-2000 |
| | Mrs. Connie Vacca | |
| Faster: | Need Ambulance | 495-3333 |

I claim:

1. A call system for use in hospitals, nursing homes and the like, wherein services provided may be classified in three groups in terms of importance in responding to the patient's needs including services lowest in importance by a nurse's aide, services of greater importance rendered by a nurse or a doctor and services of greatest importance rendered by an emergency unit or team, said call system comprising signal generating means to be located at a nurse's call station, electrical means for enabling a patient to operate the signal generating means from a patient's place of occupancy which is at a distance from the call station, said electrical means including a portable call box located within reach of the patient at the patient's place of occupancy, said call box having constructed therein a plurality of switches operable by the patient for selectively energizing the signal generating means to produce coded signals of differing message characteristics which are prioritized or coded in ascending order of importance and which are correlated with the said three classified groups of services.

2. The invention of claim 1 further characterized in that the coded signals may include a sustained energization of the generating means, slowly repeated energization of the generating means and a rapidly repeated energization of the generating means.

3. The invention of claim 1 further characterized in that the coded signals may include a sustained energization of the generating means, slowly repeated energization of the generating means and a rapidly repeated energization of the generating means, and the signal generating means produces sound signals.

4. The invention of claims 1 or 2 in which the signal generating means produces light signals.

5. The invention of claim 1 in which the patient is a person living along at a distance from the nurse's call station, and the highest priority signal calls for emergency treatment by the said emergency unit at the patient's place of occupancy.

6. The invention of claim 1 in which the said electrical means includes telephone means.

7. The invention of claim 1 in which the said electrical means includes radio means.

8. The invention of claim 1 in which the call box is constructed with an enclosure body having a front end portion in which switches of lower order of importance are contained and said enclosure body is further constructed with an intermediate enlarged portion formed with a grab slot in which a switch calling for the said emergency unit is protectively received.

9. The invention of claim 1 in which the call box includes radio transceiver means.

10. The invention of claim 1 in which the coded signals occur as a hierarchy of signals arranged in an ascending order of importance and said switches including switch means for operating any one of the hierarchy of signals and simultaneously disconnecting switch means for a lower order of signal in the said hierarchy.

* * * * *